Patented June 9, 1953

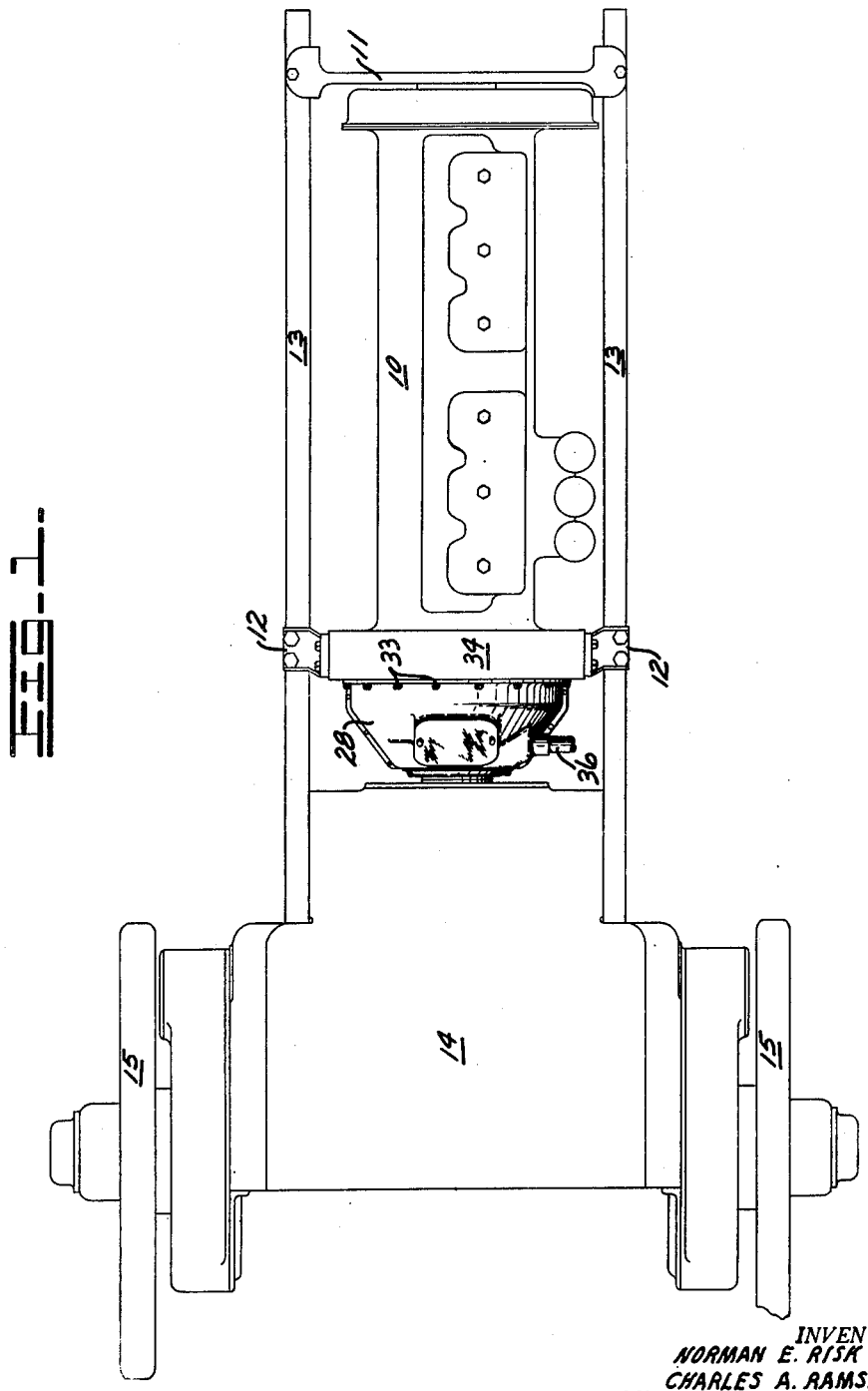

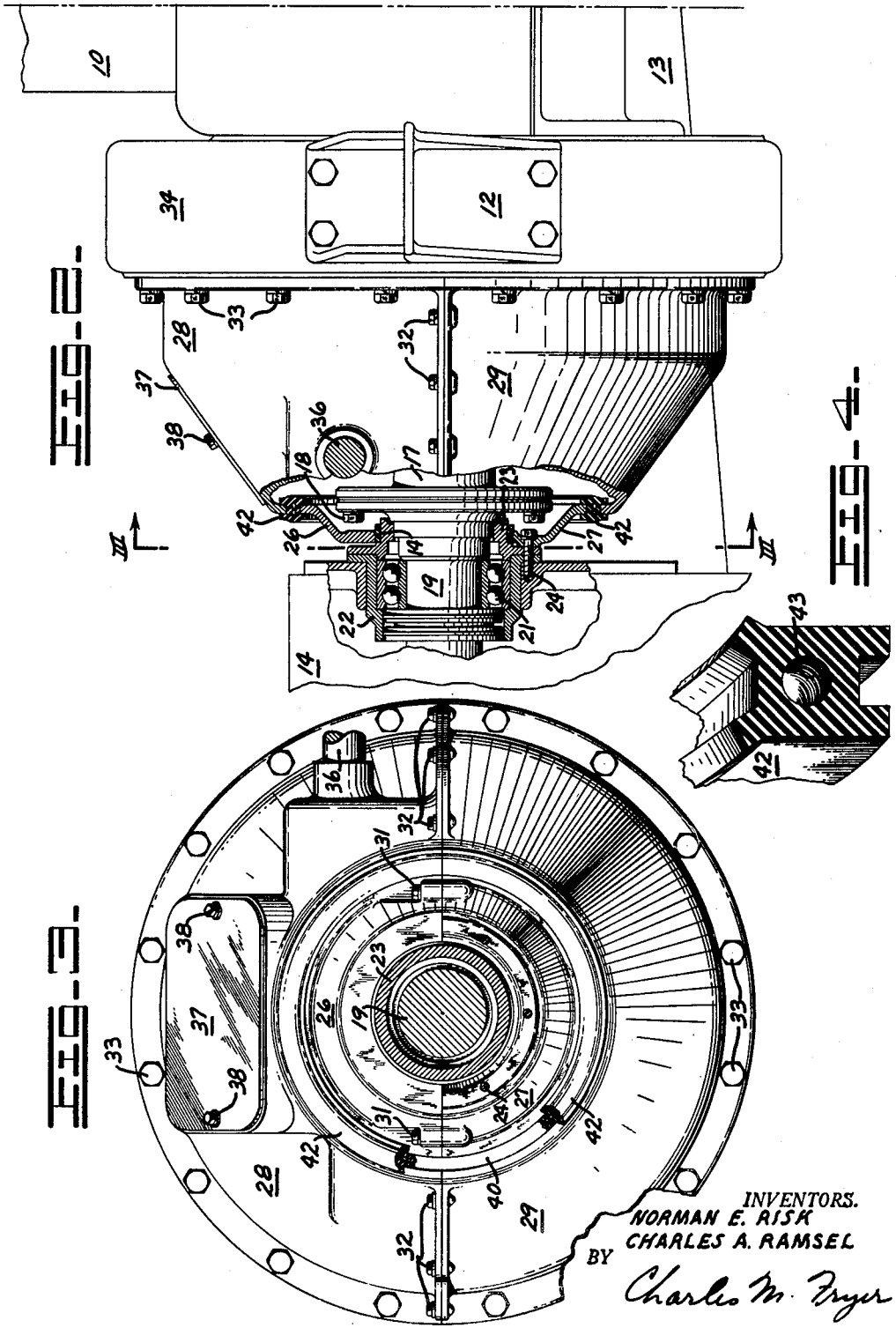

2,641,346

UNITED STATES PATENT OFFICE 2,641,346

FLEXIBLE CLUTCH ENCLOSURE

Norman E. Risk and Charles A. Ramsel, Peoria, Ill., assignors to Caterpillar Tractor Co., Peoria, Ill., a corporation of California Application April 3, 1951, Serial No. 219,036

2 Claims. (Cl. 192—112)

This invention relates to clutch enclosures of the kind employed between the engine and transmission of automotive type vehicles to prevent the entry of foreign material into the clutch parts.

This invention will have many applications but is especially adapted for use with and will be disclosed herein as applied to a tractor or like vehicle, in which space for such an enclosure is restricted, and a maximum of accessibility to the clutch parts is desired.

In the past, it has been the practice, in tractors and like heavy duty vehicles, to leave the clutch parts exposed to the atmosphere to conserve space as well as to provide ready accessibility to the clutch parts for adjustment and repair. However, in many heavy duty operations, such as earthmoving work in which the tractor operates in an extremely dusty environment, this abrasive material causes rapid wear of the clutch parts and increases the effort required to operate the clutch control linkage.

It is, therefore, an object of the present invention to provide a dust-tight enclosure for a clutch of unusually compact design, parts of which may be readily removed to facilitate repair or replacement of the clutch parts.

It is another object of this invention to provide a dust-tight enclosure for a clutch disposed between the engine and transmission of an automotive vehicle in which provision is made to compensate for variation in the distance between the engine and transmission due to manufacturing tolerances.

Other objects and advantages of the present invention will be made apparent in the following description wherein reference is made to the accompanying drawings.

In the drawings:

Fig. 1 is a plan view of a part of a track-type tractor illustrating a clutch enclosure embodying the present invention;

Fig. 2 is an enlarged fragmentary view in side elevation of a clutch enclosure embodying the present invention with parts in section;

Fig. 3 is a fragmentary sectional view taken along the line III—III of Fig. 2; and Fig. 4 is a fragmentary perspective view showing a section employed between separated parts of the clutch enclosure.

In Fig. 1, a part of a track-type tractor is illustrated as comprising an internal combustion engine 10 supported by brackets 11 and 12 from spaced frame members 13 secured to and extending forwardly from a transmission case 14 containing suitable gearing not shown for transmitting engine power to track engaging sprocket wheels 15. Engine power is transmitted to the transmission through a clutch, the driven shaft only of which is illustrated at 17 in Fig. 2. In Fig. 2, the clutch driven shaft is shown connected by bolts 18 to a transmission input shaft 19 which is supported for rotation in a bearing 21 carried in a flanged sleeve 22 extending through a suitable opening provided in the transmission case 14. The bearing 21 and sleeve 22 are held in place by a flanged retainer sleeve 23 secured to the transmission case by cap screws 24.

The clutch parts are enclosed within a divided housing comprising housing segments 26, 27, 28 and 29. The segments 26 and 27 are connected to each other by cap screws 31 (Fig. 3) and are supported from the transmission case by the cap screws 24 extending from the interior of the housing through segment 27. The segments 28 and 29 are connected to each other by cap screws 32, and by cap screws 33 to a bell housing 34 enclosing the engine flywheel (not shown). The housing segment 28 is provided with a suitable opening to accommodate a shaft 36 which is adapted for rocking movement therein to actuate the clutch control linkage. The segment 28 is also provided with a removable inspection plate 37 which is secured thereto by cap screws 38 to permit inspection and adjustment of the clutch parts.

Each pair of connected housing segments is supported independently of the other pair, and they are separated from each other by an annular space illustrated at 40 in Fig. 3, to allow variation in the distance between the adjacent faces of the transmission case and flywheel bell housing. Some variation in this distance naturally occurs, between otherwise identical vehicles, due to manufacturing tolerances. The entry of dirt or other foreign material through the opening 41 is prevented by a pair of semi-circular seals 42 of rubber or other suitable resilient material. Each of the seals is of a substantially H-shaped section as illustrated in Fig. 4 and is preferably provided with a central passage 43 to increase its natural deformability insuring a dust-tight joint. A second seal 44 is provided between the retainer sleeve 23 and segments 26 and 27 to prevent the entry of dirt at this joint.

This housing has the advantage that it can be disposed within a minimum space, and due to the flexible joint between the pairs of housing segments reduces the necessity for maintaining close dimensional control on the distance between the adjacent faces of the transmission case and flywheel bell housing. In addition, parts of the housing may be readily removed to permit removal of the clutch as a unit without disturbing the other parts of the housing or vehicle.

We claim:

1. An enclosure for a clutch employed between an internal combustion engine and a transmission case of an automotive type vehicle comprising, a pair of housing segments detachably secured to each other, a second pair of housing segments detachably secured to each other, means for supporting each pair of housing segments independently of the other pair in spaced relationship thereto, and flexible means for sealing the space between said first and second pairs of housing segments.

2. An enclosure for a clutch employed between an internal combustion engine and a transmission case of an automotive type vehicle comprising, a pair of housing segments detachably secured to each other, a second pair of housing segments detachably secured to each other, means for supporting one pair of the housing segments from the transmission case, means for supporting the other pair of housing segments from said internal combustion engine in spaced relationship to the first pair of housing segments, and flexible means for sealing the space between the first and second pairs of housing segments.

NORMAN E. RISK.
CHARLES A. RAMSEL.

References Cited in the file of this patent

UNITED STATES PATENTS

| Number | Name | Date |
|---|---|---|
| 957,602 | Duryea et al. | May 10, 1910 |
| 1,171,341 | Huff | Feb. 8, 1916 |
| 1,424,177 | Nilson | Aug. 1, 1922 |